: 3,025,151
Patented Mar. 13, 1962

3,025,151
PROCESS OF TREATING ORGANIC SLUDGES
Edward J. M. Berg, 1517 17th St., Henry C. Deubner, 1928 M, and Lind B. Nelson, 113 Whiting, all of Galveston, Tex.
No Drawing. Filed Sept. 4, 1956, Ser. No. 607,546
2 Claims. (Cl. 71—9)

The present invention relates to a sewage treatment process and more particularly to a process for treating sewage solids.

At the present time, industrial and sanitary sewage is subjected to a treatment for purification thereof wherein the solids matter in the sewage is separated from the fluid or liquor in a primary settling stage and the separated solids in the form of a sludge or slurry having a solids content of say, 2.25% thereafter subjected to an anaerobic digestion, while the effluent or liquor from the primary settling stage is further clarified.

The anaerobic digestion of the solids is by biological cultures which are placed in the solids matter in any suitable manner well known in the art, for the purpose of decomposing or reacting with the constituents in the solids waste to place them in stable form so that the biological oxygen demand of the resulting stabilized solids is greatly reduced, such digestion normally requires a period of from three to five weeks, after which the digested solids are filtered for separating any fluid therefrom.

The long digestion period normally required to stabilize the constituents of the solids matter from the primary stage of the sewage treatment process necessarily and unduly limits the capacity of the sewage plant, thereby acting as a bottle-neck in sewage treatment and often resulting in overloading of the sewage plant which further reduces the efficiency of the plant operation. Quite often the solids matter of the sewage will contain certain constituents or components such as carbohydrates in the form of fibrous cellulose, greases, colloidal matter and hair which is extremely difficult to filter. The presence of grease in the solids also interferes with proper filtration procedures to such an extent as to require frequent cleaning of the filter cloth and filter apparatus.

The present invention relates to a sewage treatment process for industrial and sanitary sewage wherein the solids matter may be treated so as to decrease the grease content, and render the remaining constituents of the solids to a suitable particle size which does not interfere with subsequent filtration of the digested solids.

Still a further object of the present invention is to treat the solids material from the primary stage, or from any other stage of industrial or sanitary sewage process to a partial aerobic digestion for a limited period of time and under controlled temperature conditions so as to render innocuous certain constituents of the solids which would otherwise interfere with filtration operation.

Still another object of the invention is to provide a process for treating solids from a sewage plant to substantially eliminate obnoxious odors therefrom, decrease the grease content and reduce the constituents to a particle size desirable for aiding in filtration.

Industrial and sanitary sewage containing nitrogenous material is a ready source of fertilizer component; however, fertilizers are quite often produced in pellets, so that as the fertilizer is spread on fields, loss thereof by being carried off in the wind is greatly reduced. It is, therefore, essential that the components of such fertilizers be of suitable particle size so that they may be formed into pellets.

Quite often organic sludges containing nitrogenous material, and which might otherwise be used as components of fertilizers, are rendered substantially useless as fertilizer components because of the presence of certain constituents or components in the organic sludges such as carbohydrates in the form of fibrous cellulose, greases, colloidal size matter in the sludges, and hair.

The physical structure and particle size of some of the components of industrial and sanitary sludge, such as the particle size of fibrous cellulose, colloidal matter and hair, is such that sludges having these components are substantially useless as fertilizer components, because it is extremely difficult, if not impossible, to form sludges containing the above material into a pellet size. Furthermore, organic sludges containing carbohydrates in the form of fibrous cellulose and colloidal matter are extremely difficult to filter.

Therefore, another object of the present invention is to treat organic sludges which would otherwise be suitable for use as fertilizer components, so as to render innocuous the carbohydrates therein in the form of fibrous cellulose whereby the sludge may be more readily filtered and easily formed into pellet size material.

Still another object of the present invention is to treat organic sludges which would otherwise be suitable for use as fertilizer components so as to produce a resulting particle size of the sludge so that it may be more easily filtered and readily formed into pellets.

A further object of the invention is to treat organic sludges which would otherwise be suitable for use as fertilizer bases so as to render innocuous carbohydrates therein in the form of fibrous cellulose, and colloidal size matter, whereby the sludge may be more easily filtered and readily formed into pellets.

Still another object of the present invention is to provide a process of treating sewage solids or sludge wherein the odors from the sludge are eliminated so that the solids matter from the sewage may be more readily acceptable as a fertilizer component.

And yet a further object of the invention is to provide a treatment for organic sludges so as to decrease the grease content of the sludge.

And still a further object of the invention is to provide a process for treating organic sludges which are to be used as fertilizer components, wherein the amount of nitrogenous material present in the sludge on a dry weight percentage basis is increased.

Other objects and advantages of the present invention will become more readily apparent from a consideration of the following description.

As previously mentioned, present sewage treatment, industrial and sanitary, initially separates solids material from the liquor in the primary stage, and the separated solids and effluent from the primary stage are each separately subjected to additional clarification procedures.

Whereas the present procedure is to digest the separated solids for an extensive period of time, the present invention contemplates a process for partial aerobic digestion of the separated solids of the sewage treatment process under controlled temperature conditions and for a length of time which time is relatively short to accomplish certain desirable results.

The present invention may be practiced on industrial and sanitary sewage, and for purposes, by way of example only, the following description is directed in particular to sanitary sewage treatment.

As previously mentioned, the solids matter in sanitary sewage is separated from the liquor in a primary settling stage, and the liquor and separated solids each separately subjected to additional clarification procedures.

In accordance with the present invention, the solids separated in the initial primary settling stage are placed in any suitable tank or container. A biological culture is placed in the container which culture will accomplish the desired digestion or decomposition of the fibrous cellulose (or other material which generally tends to interfere with subsequent filtration treatments of the solids) while the solids are aerated. The inoculation of the solids with the biological culture may be accomplished by any suitable means well known in the art, and it is believed unnecessary to give a detailed description of the culture or the manner of inoculation at this point. The aeration is by any suitable means and for a suitable period of time, while maintaining the temperature of the solids within a desired range so as to encourage the growth and activity of the biological culture so as to destroy carbohydrates such as those in the form of fibrous cellulose and other constituents of the solids matter which is of a particle size that normally interferes with filtration of the solids.

The aeration of the solids accomplishes two functions namely, it supplies the needed oxygen for the proper functioning of the micro-organisms and it also intimately mixes all freshly added solids with those presently in the container. The temperature of the solids may be controlled by pre-heating the air used for aeration, or, if desired, the solids may be subjected to external heating while being aerated.

It is desirable to maintain the temperature of the sludge during aeration within the range that is best adapted for the biological culture used. It should be quite obvious that the time of treatment of the solids in the tank or container depends upon the characteristics of the particular solids being treated, as well as the means for aeration and agitation of the solids and other factors such as the amount of air supplied, temperature, the characteristics of the biological life developed, and whether the process is carried out batch-wise or continuous. A suitable temperature range of the solids matter while being subjected to the aeration is 70° F. to not more than 120° F., with the preferable range between 70° F. and 103° F. Maintenance of the above temperature range apparently promotes, creates and increases the action of the biological culture, while not being too high so as to kill or discourage the action of the biological culture.

The aeration of the solids matter is continued until the constituents thereof have been rendered innocuous, or digested sufficiently until the particle size of the carbohydrates, including the fibrous cellulose, and any other matters such as colloids, etc., is such that they will not interfere with subsequent filtration of the partially digested solids. Generally, when the fibrous cellulose has been reduced to a desired particle size, all other substances will have been reacted upon a sufficient amount so that the physical characteristics, particularly the particle size, of the digested sludge is such that filtration thereof may be more easily accomplished.

At any event, samples of the digested sludge may be taken, and filtered through a Buechner funnel. The resulting filtercake may be broken so as to expose any fibrous cellulose material therein, or any other visible constituents having particle size which may be deleterious to filtration. This filtration procedure and visual examination procedure may be repeated until the particle size of the fibrous cellulose is reduced so as to not interfere with the filtration. We have discovered that the partial digestion may be accomplished in a period of approximately three days, such time being sufficient to reduce the carbohydrates, including those present in the solids in the form of fibrous cellulose and other deleterious materials to a particle size suitable for filtration.

By way of further and more specific example, samples of the sludge being treated by the present invention are adjusted to the proper pH for filtration by adding a conditioner (which conditioning process is well known in the art), and then filtered by use of a Buechner funnel. For best visual examination, enough sludge should be used in the samples to form a filter cake from one-fourth to one-half inch thick. This cake is then removed from the funnel and broken crosswise (cracked apart). If a large amount of fibrous material is present, these fibres will be seen extending from the edges of the break, some of them bridging across it. Additional treatment is thus indicated. Visual comparison of such tests made at say four hour or six hour intervals will give a clear picture of the progressive destruction of the fibrous material.

The treatment by the present invention is continued until, by visual examination, the cellulose has been digested a desired amount. The type of sludge being treated will to some extent govern the treatment time. Complete destruction of this fibrous material may produce a gelatinous or colloidal condition with extremely small particles that make filtration difficult. The broken body of the filtered cake from the Buechner filter test should show a granular structure, with a minimum of very fine particles and retained moisture. It must not be slimy or sticky for such condition indicates too prolonged treatment and too extensive destruction of organic material.

Solids matter from the other stages of sewage treatment plants may also be subjected to the partial aerobic digestion of the present invention with equal success.

By way of example only, we have practiced the invention as follows:

The sludge in the treatment tank of a sewage treatment plant, which is about 2.25% solids and consists of the solids settled out of about 60,000 gallons of primary sludge and 275,000 gallons of waste activated sludge and about 5,000 gallons of settled activated sludge from the final settling tanks of a sewage treatment plant, were placed in a container so that the depth of the sludge in the container was approximately ten feet. In pounds of dry matter, the initial loading of the container was about 12,500 pounds of primary sludge, 9,300 pounds of activated sludge, and 400 pounds of settled activated sludge.

Air at the rate of 1,500,000 cubic feet per day was blown through this mixture and the temperature of the sludge in the container was maintained by preheating the air to approximately 176° F. prior to diffusing it in the container. The temperature of the sludge was maintained between 70° F. and 102° F.

To determine readiness for processing, a sample of the sludge was brought to the pH best adapted for filtration, which in the above example was 4.5 and the sample filtered through a Buechner funnel. As previously described, the filter cake was broken so as to expose any fibrous cellulose or other visible constituents deleterious to filtration in the filter cake and this filtration procedure and visual examination was repeated until the particle size of the constituents such as the fibrous cellulose in the sludge was reduced so as to not interfere with filtration. In the above example, the sludge was treated for a period of approximately three days prior to rendering the carbohydrates, including those present in the form of fibrous cellulose and other deleterious materials innocuous or reducing them to a particle size suitable for filtration.

It should be readily apparent that any suitable equipment may be used for practicing the invention depending upon whether the treatment is carried out in a continuous or batch-wise fashion. Any suitable well known equipment for diffusing the air into the container may be used, some of such types being the diffuser tube as manufactured by the Chicago Pump Company, or those manufactured by the Carborundum Company, as well as those manufactured by the Walker Process Company or any other suitable mechanical aerator. Of course, the retention time in the container will vary, and it is therefore necessary to periodically filter samples of the sludge to determine when the fibrous cellulose has been decomposed.

The present treatment not only digests the fibrous material in the sludge to a desired particle size to encourage or enhance subsequent filtration of the digested sludge, but also the grease content of the sewage is materially reduced and objectionable odors are removed from the solids.

Furthermore, the value of organic sludges which may be used as fertilizer components is determined by the percentage of nitrogenous matter present in the sludge. It should be readily appreciated that organic sludges which would otherwise be usable as components of fertilizer, but which contain objectionable matter such as carbohydrates in the form of fibrous cellulose, grease, and colloidal matter in the sludge so as to render such sludges undesirable for use in fertilizers, can be subjected to the present invention to digest the fibrous materials such as the fibrous cellulose to a desired particle size while reducing the grease content and over-all digesting the sludge to a suitable particle size whereby it may be more readily filtered and acceptable for use as a component of fertilizer because it can be formed into pellets. Also, the resulting nitrogenous content of the sludge is greater, thereby increasing its commercial value as a component of fertilizer.

The treatment of sewage wastes may be broadly divided into two classifications: (a) anaerobic treatment wherein the waste materials are subjected to biological action in the absence of oxygen in order to completely decompose the constituents in the waste to stable forms with a view of decreasing the biological oxygen demand of the stabilized solids removed from the wastes as well as decreasing the biological oxygen demand of the resulting clarified effluent; and (b) the aerobic treatment of fluid wastes wherein the decomposition of fluid constituents in the waste is accomplished biologically in the presence of oxygen to decompose the constituents and thereby reduce the biological oxygen demand of the resulting solids and the effluent of the waste.

We are familiar with both of the above procedures; however, the first of the procedures above described will not always operate satisfactorily on sludges with a view of rendering them suitable for use as components in fertilizer, because the reaction or digestion of the sludge is carried almost to completion and the amount of nitrogen is materially reduced.

While the second procedure has not been applied to solids waste, it can not be successful if carried to complete digestion because of the undesirable colloidal ash resulting from the complete digestion.

As previously mentioned, the description of the present invention has been applied to sanitary sewage treatment and more particularly to the solids matter from a sanitary sewage treatment plant; however, the present invention may be applied with equal success to an industrial sewage treatment arrangement. The term "sewage" as used herein applies both to industrial and sanitary wastes.

Of course, it is recognized that various organic sludges reach optimum filter conditions as varying pH's. In the sample given it was noted that the pH suitable for filtration was 4.5; however, it is recognized that the pH of a sludge at optimum filtration conditions will vary depending upon the particular constituents of the sludge. The present invention reduces the amount of reagent, or treatment, necessary to bring a solids waste subjected to this invention to a pH desirable for filtration.

Of course, the amount of fiber content in the sludge determines also the retention and treatment time.

While we have described the present invention wherein visual means were used to determine the particle size, or the lack of fibrous cellulose, etc., in the sludge, it should be noted that suitable instrumental means for determining when the desired particle size range has been reached may be used. For example, an electric eye which automatically determines the presence or absence of particle sizes of a desired range would in turn instrumentally note that the reaction is complete so far as the decomposition of the fibrous cellulose is desired. However, we have found that the visual test above described is as satisfactory as any mechanical means.

It should be also noted that sludge from any suitable stage in a sewage treatment plant or other sludge from other industrial waste treatments which contains nitrogenous material and is suitable for use as a fertilizer may be subjected to the present invention with satisfactory results.

As previously mentioned, it is undesirable to completely decompose the carbohydrates in the form of fibrous cellulose because colloids are formed that are extremely difficult to filter.

From the foregoing description it can be readily appreciated that we are treating the sludge to a limited aerobic procedure so as to decompose the fibrous cellulose on the one hand, while preventing such material from being completely decomposed to a colloidal state which would increase the difficulty of filtering. We have found that when the sludge is partially decomposed as described herein, not only is the filtering of the sludge rendered easier, but a resulting percentage increase in the nitrogen content of the sludge is obtained.

It should be readily appreciated that the foregoing invention increases or improves plant capacity because it removes the high biological oxygen demand load at the outset and treats it separately by a partial aerobic digestion in order to accomplish desired results. The treatment of the solids by the present invention decreases the grease content and removes or renders innocuous other substances which would normally interfere or decrease the filtration procedure. Also, our invention produces an odorless solid which, in the instance of organic solids or sludges which are to be used as fertilizer components, contains a higher percentage of nitrogenous material than heretofore possible.

Broadly the invention relates to a sewage treatment process and more particularly to a process for treating the solids matter of sewage to a partial aerobic digestion for reducing the grease content, increasing the nitrogen content, and providing a partially digested sludge which may be more readily filtered and formed into pellets.

What is claimed is:

1. The method of treating domestic sewage having cellulose fibers therein which includes the steps of treating at least part of the sewage by a stabilized activated sludge treatment, settling solids from said sewage including solids resulting from the stabilized activated sludge treatment, withdrawing a slurry of said solids and water for treatment separate from the activated sludge treatment, said slurry being liquid in nature, bubbling air up through slurry thus withdrawn, in a condition substantially free from fibers other than those derived from the sewage, while still liquid in nature but in the thickened condition resulting from settling, in the presence of aerobic bacteria for a period exceeding twenty-four hours and until the body of slurry considered as an entirety, and the cellulose fibers therein, have been reacted substantially beyond the degree of reaction of activated sludge treatment to such an extent that when a filter cake formed from said reacted slurry is cracked apart it will be substantially free from cellulose fibers bridging across the break, and until the filtering characteristics of the slurry have been substantially improved by this treatment, and thereupon discontinuing this treatment before the biological reaction on the cellulose fibers has reached the terminal condition in which the sludge is slimy and difficult to filter, and thereafter filtering said slurry to separate the filterable solids from most of the water.

2. The method of treating domestic sewage having cellulose fibers therein which includes the steps of treating at least part of the sewage by a stabilized activated sludge treatment, settling solids from said sewage including solids resulting from the stabilized activated sludge treatment, withdrawing a slurry of said solids and water for treatment separate from the activated sludge treatment, said slurry being liquid in nature, bubbling air up through slurry thus withdrawn, in a condition substantially free from fibers other than those derived from the sewage, while still liquid in nature but in the thickened condition resulting from settling, in the presence of aerobic bacteria for a period exceeding twenty-four hours to an end point determined by comparing successive test filter cakes made at intervals of several hours, the end point being indicated by marked diminution in the number of cellulose fibers bridging the crack when the filter cake is cracked apart and discontinuing this treatment before the biological reaction on the cellulose fibers has reached the terminal condition in which the sludge is slimy and difficult to filter, and thereafter filtering said slurry to separate the filterable solids from most of the water.

References Cited in the file of this patent

UNITED STATES PATENTS

| | | |
|---|---|---|
| 1,254,833 | Moor | Jan. 29, 1918 |
| 1,392,212 | Peck | Sept. 27, 1921 |
| 1,617,014 | Derleth | Feb. 8, 1927 |
| 1,980,244 | Wright | Nov. 13, 1934 |
| 2,178,818 | Earp-Thomas | Nov. 7, 1939 |
| 2,209,613 | Roeder | July 30, 1940 |
| 2,285,834 | Proctor | June 9, 1942 |
| 2,474,833 | Eweson | July 5, 1949 |